United States Patent [19]

Braun

[11] 3,825,829

[45] July 23, 1974

[54] RADIO SYSTEM EMPLOYING SIMULTANEOUSLY TRIGGERED PULSE REPEATERS

[75] Inventor: William V. Braun, Lauderhill, Fla.

[73] Assignee: Motorola, Inc., Franklin Park, Ill.

[22] Filed: Jan. 29, 1973

[21] Appl. No.: 327,332

[52] U.S. Cl. .......................... 325/6, 325/8, 325/13, 325/22

[51] Int. Cl. .......................... H04b 7/18

[58] Field of Search .......................... 178/22, 66 A; 325/4–6, 8, 13, 14, 16, 18, 21, 22, 15

[56] References Cited

UNITED STATES PATENTS

| | | | |
|---|---|---|---|
| 2,340,590 | 2/1944 | Hennig | 178/66 A |
| 2,425,315 | 8/1947 | Atwood et al. | 325/6 |
| 2,533,269 | 12/1950 | Lehmann | 325/6 |
| 3,239,761 | 3/1966 | Goode | 325/22 |

*Primary Examiner*—Albert J. Mayer

*Attorney, Agent, or Firm*—Eugene A. Parsons; Vincent J. Reuner

[57] ABSTRACT

An asynchronous radio repeater system for providing radio coverage within a large building or the like employs a plurality of pulse repeaters distributed over the communications area. Each repeater receives oscillation pulses from a portable pulse transmitter or from another repeater and transmits pulses of oscillations having substantially the same frequency as the received oscillations. A blanking system is incorporated in each repeater to disable the repeater for a predetermined time duration following tee transmission of a pulse to prevent self-sustaining oscillation of the system.

13 Claims, 4 Drawing Figures

RADIO SYSTEM EMPLOYING SIMULTANEOUSLY TRIGGERED PULSE REPEATERS

BACKGROUND

1. Field of Invention

This invention relates generally to communications systems, and more particularly to low power communications systems for providing communications within a building, such as an industrial plant or a hospital, or a long excavation, such as a tunnel or a mine.

2. Prior Art

Several techniques for providing communications in such a structure are known. Well known paging systems employ a transmitter which transmits paging signals to several portable paging receivers worn by the personnel with whom contact is to be maintained. A wire antenna, generally strung on the roof of the structure above the area over which it is desired to maintain communications, is used to disperse the signals from the transmitter over the communications area for receipt by the portable receivers. In another such system, a higher power transmitter, feeding a conventional antenna, is employed to saturate the desired area with radio signals for receipt by the portable receivers.

Whereas these techniques provide ways to achieve communications within a limited area, the first technique requires that a wire antenna be strung over the entire area of coverage. The stringing of the wire can be quite costly, particularly in large installations and in long narrow structures such as tunnels and mines. The second technique requires the use of a relatively high power transmitter, thereby limiting the number of transmitters, operating on the same frequency, that can be used within a geographic area. In addition, the second technique is unsuitable for use in structures, such as mines, which have a number of tunnels that are not in line of sight with the transmitter. Furthermore, neither system provides for convenient two way communication, since both systems require that a relatively high power portable transmitter be used to provide communications back to the base station. As a result, in paging systems, particularly of the first mentioned type, only one way communications is provided to minimize the size and battery requirements of the portable unit.

SUMMARY

It is an object of the present invention to provide an improved communications system for limited area structures, such as large buildings and tunnels.

It is a further object of this invention to provide a paging system that provides two way communications.

It is another object of this invention to provide a communications system that provides two way communications requiring only minimal power from the portable units.

A still further object of this invention is to provide a communications system capable of transmitting digital data and clear or scrambled voice signals.

Still another object of the invention is to provide a low power communications system for a large structure that eliminates the need for stringing wire over the entire communications area.

In accordance with a preferred embodiment of the invention, a "chain reaction" type of repeater system is used in conjunction with several portable pulse transceivers. Each portable unit, which is carried by anyone desiring to send and receive messages, consists of a pulse transmitter and receiver. For voice communications, analog to digital conversion means are provided to convert the voice signals to pulse signals for transmission by the transmitter, and to convert the pulse signals received by the receiver to voice signals.

Each repeater contains a pulse receiver and a pulse transmitter, both operating on the same frequency as the portable units. No modulation or demodulation circuitry need be provided in the repeaters. The repeaters each receive pulses of radio frequency oscillations from a portable unit or from another repeater, and for each pulse received, a similar pulse of radio frequency oscillations having substantially the same frequency is generated by the repeater. A blanking circuit is provided in each repeater to disable the receiver for a predetermined time interval following the receipt of a pulse to prevent self-sustaining oscillation of the system. In this manner, for each pulse transmitted by one of the portable units, each of the repeaters is triggered by the portable unit or by another repeater in a "chain reaction" fashion to cover the desired area with pulses. After each triggering, each repeater is rendered temporarily inoperative to allow all pulses from other repeaters in the vicinity to decay prior to being rendered operative for the receipt of a subsequent pulse.

DETAILED DESCRIPTION

Figure 1:
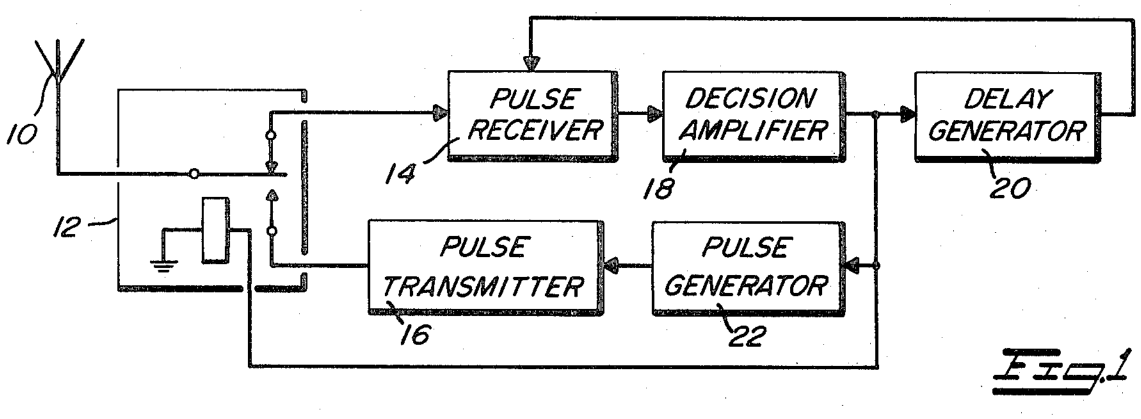
FIG. 1 is a block diagram of a representative repeater for use in the system according to the invention.

Referring to FIG. 1, a typical repeater employs an antenna 10 connected to an antenna switch 12 which is in turn connected to a pulse receiver 14 and a pulse transmitter 16. The antenna switch 12 is shown in FIG. 1 as a mechanical relay for purposes of illustration, however, in a preferred embodiment, an electronic switch, such as, for example, a diode switch would be used. Separate antennas for the receiver and transmitter, or an isolator connected to the antenna and to the receiver and transmitter may be used in alternate embodiments. The output of the pulse receiver 14 is connected to a decision amplifier 18. The output of the decision amplifier 18 is connected to a delay generator 20, a pulse generator 22, and to the control circuitry of the antenna switch 12. The output of the delay generator 20 is connected to the pulse receiver 14.

The operation of the repeater of FIG. 1 is as follows. The antenna switch 12 normally connects the antenna 10 to the input of the receiver 14 to allow receipt of signals by the receiver 14. Pulses received by the receiver 14 in the form of bursts of radio frequency oscillations are applied to the decision amplifier 18 which in turn applies a signal to the delay generator 20, to the pulse generator 22 and to the antenna switch 12 if the received pulse exceeds a predetermined level. The signal from the decision amplifier causes the antenna switch 12 to connect the antenna 10 to the pulse transmitter 16 and simultaneously causes the pulse generator 22 to trigger the pulse transmitter 16 to cause the latter to provide a burst of radio frequency oscillations having a predetermined time duration and substantially the same frequency as the received oscillations to the antenna 10. The frequency of the burst transmitted need not be exactly the same frequency as the received burst, but the transmitted frequency must be sufficiently close to the received frequency to permit receipt of the transmitted bursts by other repeaters and portable units within range. At the same time, the delay generator 20 applies a blanking pulse to the pulse receiver 14 to prevent the receiver 14 from receiving the pulse transmitted by the transmitter 16. The blanking pulse generated by the delay generator 20 must be of a sufficient duration to maintain the receiver 14 inoperative until the pulses from all of the repeaters within radio range have decayed. It should be noted that although the system of the preferred embodiment employs bursts of radio waves, a similar system providing pulses of sound waves or light waves may be built and still fall within the scope of the invention.

Figure 2:
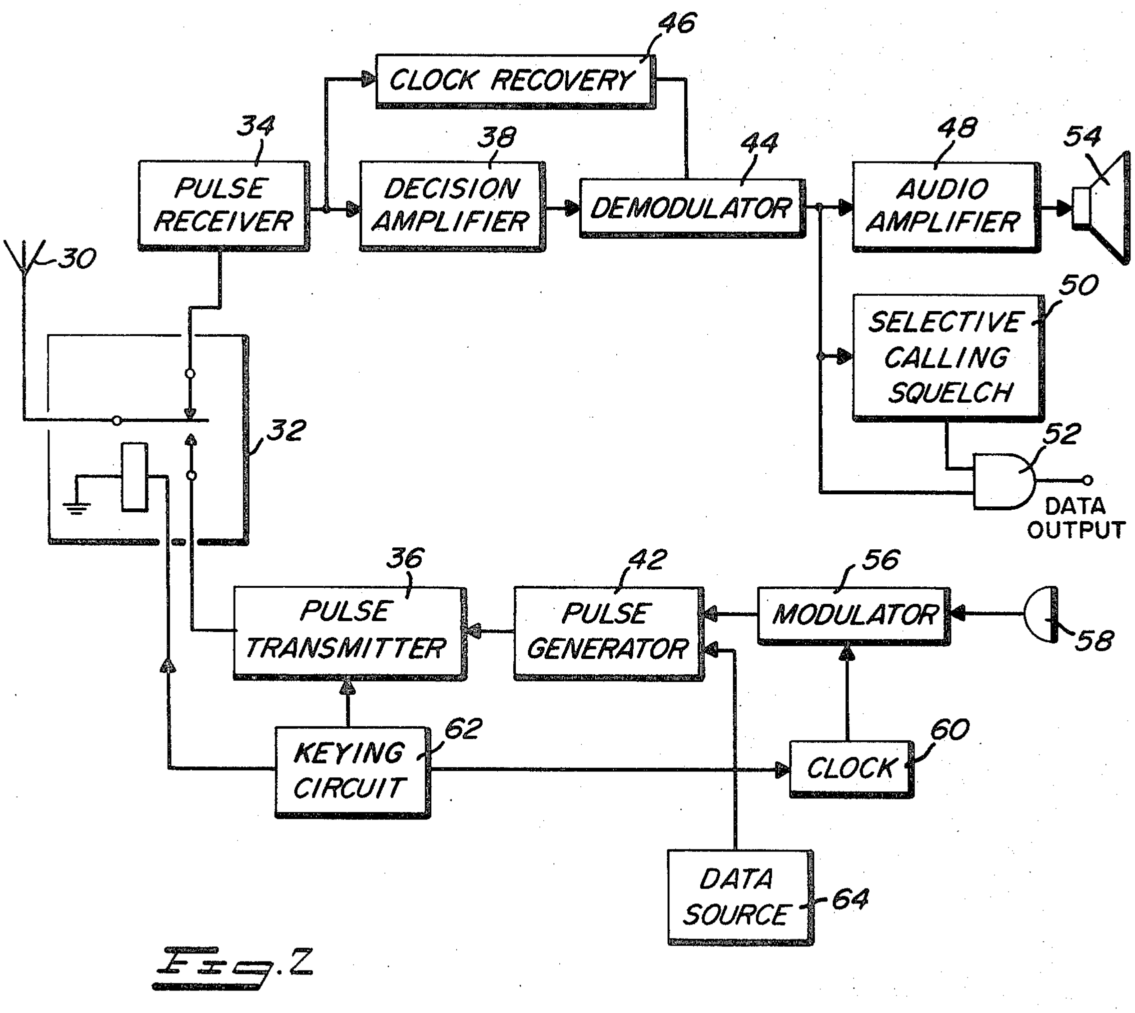
FIG. 2 is a block diagram of a typical portable unit for use with the communications system according to the invention.

FIG. 2 shows a typical embodiment of a portable unit for use with the system according to the invention. The portable unit may be carried by a person, mounted to a vehicle, or placed in a stationary location, such as, for example, an office. The portable unit contains a transceiver portion similar to the repeater of FIG. 1. In the circuit of FIG. 2, an antenna 30, an antenna switch 32, a pulse receiver 34, a pulse transmitter 36, a decision amplifier 38 and a pulse generator 42 are similar to analogous components in the circuit of FIG. 1. In addition to circuitry similar to that present in a repeater, the receiver portion of the circuit of FIG. 2 also contains a demodulator 44 connected to the decision amplifier 38, and a clock recovery circuit 46 connected to the pulse receiver 34 and to the demodulator 44. The last mentioned components serve as a means for converting signals from the receiver 34 to signals usable by subsequent stages. An audio amplifier 48 is connected to the demodulator 44, and a selective calling squelch 50 is connected to the demodulator 44 and to the audio amplifier 48 for selectively rendering the audio amplifier operative upon receipt of a predetermined pulse code. A data output gate 52 is connected to the demodulator 44 and to the selective calling squelch 50 and provides a data output for systems wherein data transmission is desired. A transducer, in this embodiment a loudspeaker 54, is connected to the audio amplifier 48 for the reproduction of audio signals.

The transmitter portion of the circuit of FIG. 2 is similar to the transmitter portion of the repeater of FIG. 1 with the addition of a modulator 56 connected to the pulse generator 42, a microphone 58 and a clock 60 connected to the modulator 56, and a keying circuit 62 connected to the antenna switch 32, the pulse transmitter 36 and the clock 60. The modulator 56 includes an analog to digital converter for converting the analog signal from the microphone 58 to a pulse train under the control of the clock 60 for operation of the pulse generator 42. Although separate clock circuits and a separate modulator and demodulator are shown in the transmitter and receiver portions of FIG. 2, it should be noted that common clock and modulator circuits can be employed to provide both the modulation and demodulation functions.

Any type of pulse code modulator may be employed in modulator 56. In a preferred embodiment a delta modulator is employed, and a voice privacy system as described in U.S. Pat. No. 3,639,690, issued Feb. 1, 1972 to the same inventor et al., and assigned to the same assignee, may be used in conjunction with the delta modulator. The selective calling squelch 50 may be similar to the system described in U.S. Pat. application Ser. No. 218,107, filed Jan. 17, 1972, by the same inventor et al., and assigned to the same assignee.

The operation of the portable unit is as follows. When the portable unit is transmitting, the keying circuit 62 is energized by a push to talk switch on the unit. The keying circuit causes the antenna switch 32 to connect the pulse transmitter 36 to the antenna 30, renders the pulse transmitter 36 responsive to pulses from the pulse generator 42, and causes the clock 60 to apply clock pulses to the modulator 56. The modulator 56 receives an analog information signal from the microphone 58 and clock pulses from the clock 60 and applies pulses representative of the analog information signal from the microphone 58 to the pulse generator 42. The pulse generator 42 causes the pulse transmitter 36 to generate a short pulse of radio frequency energy for each pulse received from the pulse generator 42. If data transmission is desired, a data information signal may be applied directly to the pulse generator 42 from a data source 64 connected to the pulse generator 42. A more detailed explanation of the pulses generated by the system is given in the discussion of the FIG. 4 in a subsequent portion of this application.

In the receive mode, the antenna relay 32 connects the antenna 30 to the pulse receiver 34. The pulses received by the receiver 34 are applied to a clock recovery circuit 46 which generates a clock signal for application to the demodulator 44. The received pulses are also applied to the decision amplifier 38 which applies a pulse to the demodulator 44 for each pulse from the receiver 34 that exceeds a predetermined level. The demodulator 44, which includes a delta demodulator when a delta modulator is used in the modulator 56, receives the clock pulses from the clock recovery circuit 46 and the pulses from the decision amplifier 38, and provides a received information signal in the form of an analog signal to the audio amplifier 48 and to the selective calling squelch 50. The demodulated information signal is amplified by the audio amplifier 48 for application to the loudspeaker 54. The selective calling squelch 50 is used to disable the audio amplifier 48 and the data gate 52 in selective calling systems when the proper code has not been received, and may be eliminated in systems wherein the selective calling feature is not desired. The data gate 52 provides a data output if transmission of data information signals is desired, and may be eliminated in systems where only voice is transmitted.

Figure 3:
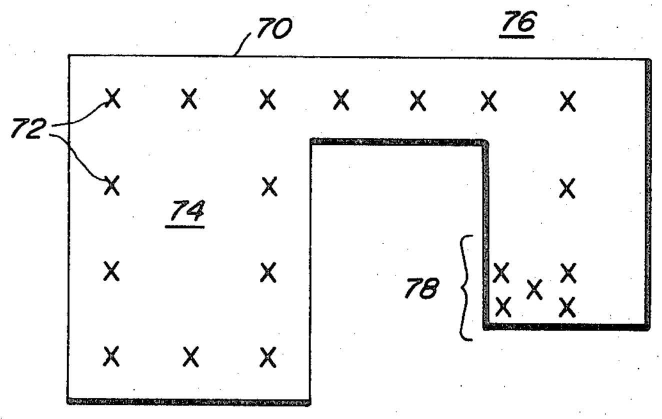
FIG. 3 represents a floor plan of a typical industrial plant, and shows the placement of repeaters for providing communications over the plant area.

FIG. 3 shows the flexibility with which the repeaters of the instant invention may be deployed over an area, such as, for example, a large office, hospital or factory building. Referring to FIG. 3, there is shown a floor plan of a building having an area enclosed by a wall 70. A plurality of repeaters 72, denoted by X's, is deployed throughout the area enclosed by the wall 70. Because of their simplicity, the repeater units can be built in a small package having prongs or a screw base for attachment to an electrical outlet or a light socket, thereby allowing the repeater units to be placed wherever they are required. The floor plan of FIG. 3 includes three areas. These areas include a large, relatively interference free area 74, such as, a drafting room, a hallway 76, and a high interference area 78, such as, a machine shop. Note that in the relatively interference free area, the repeaters 72 may be relatively widely spaced to achieve coverage of a large area with relatively few repeaters. In the hallway area 76, the repeaters are linearly spaced along the length of the hall to provide communications between the rooms at either end of the hall 76. The repeaters may be placed near the center of the hall, as shown in FIG. 3, and may be placed in light fixtures, or the repeaters may be plugged into outlets along either of the walls of the hall. When the repeater system according to the invention is used to provide communications in an elongated structure, such as, for example, a mine or a tunnel, the repeaters would be deployed in a fashion similar to the way they are deployed in the hall area 76. In the high interference area 78, the repeaters are spaced more closely than the spacing provided in the low interference area 74 or the hall area 76 to provide sufficient pulse energy to override any interference present. It is also desirable to desensitize the repeater by means of AGC or an RF attenuator to prevent false triggering. As can be seen from FIG. 3, the placement of the repeaters can be tailored to meet the problems associated with each individual installation, and a repeater can be added or removed as necessary to accommodate changing conditions. This degree of flexibility is not possible with prior art systems, wherein the transmitter power and the antenna system must be designed to accommodate the worst expected conditions, and wherein it is difficult to change the system once the installation has been made.

The absolute spacing between the repeaters is determined by the power of the repeater and remote unit transmitters and by the propagation and interference characteristics between repeaters. In general, fewer repeaters can be used if higher repeater power is employed, and if the interference is relatively low. The exact spacing between repeaters is determined by engineering design consideration and can be on the order of tens of feet to hundreds of feet, depending on the installation. The main considerations for determining spacing are that a portable unit anywhere within the boundary of the coverage area be able to trigger at least one and preferably two repeaters, and that each repeater be able to trigger at least one other repeater such that each pulse generated by a portable unit triggers the entire repeater system simultaneously in a "chain reaction." Spacing the repeaters such that each repeater triggers or is triggered by more than one of the other repeaters provides a margin of safety for changing conditions by providing a form of system diversity, and allows the system to provide satisfactory operation in the event of failure of one or more of the repeaters.

Figure 4:
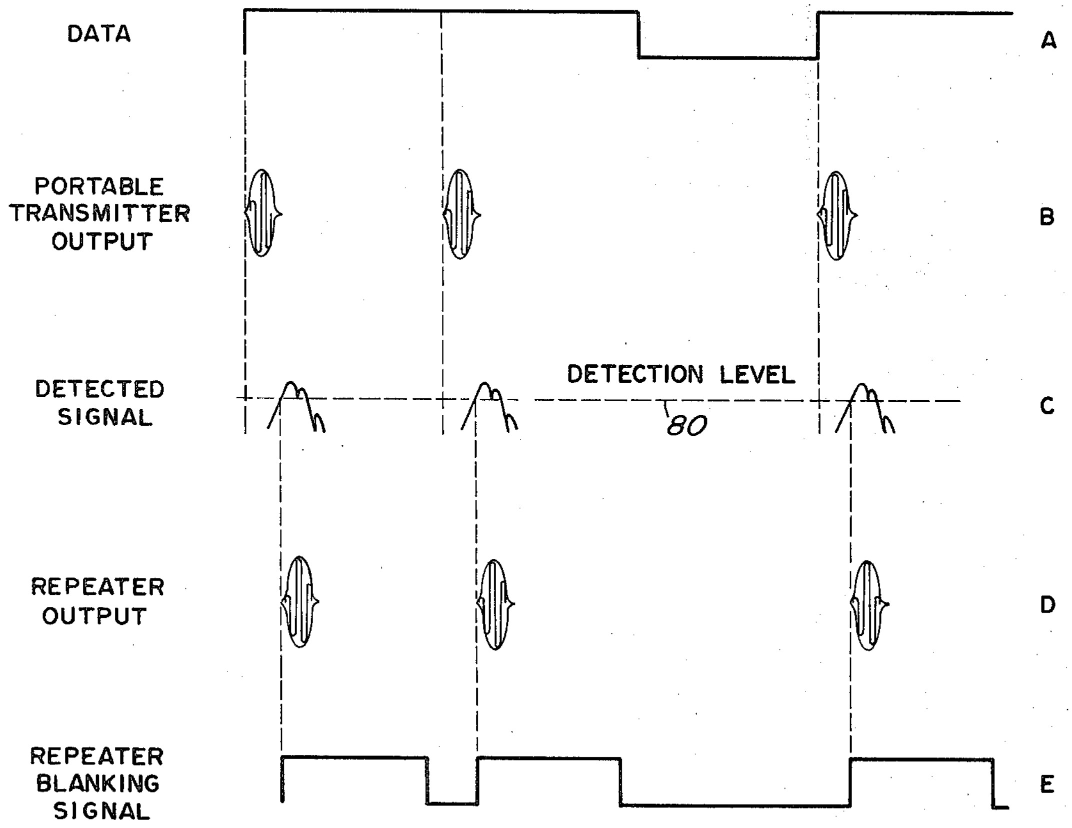
FIG. 4 is a graph showing the pulse wave forms appearing at various portions of the system.

Referring to FIG. 4, curve A shows a representative data signal to be transmitted by the system according to the invention. The data signal may be obtained from a data signal generator in a portable unit equipped to transmit data, or may be developed by the modulator of the portable unit which converts an analog voice signal to a digital signal of the type shown in curve A. For purposes of illustration, the data signal in curve A has been chosen to be the 4 bit sequence (1,1,0,1). The maximum rate at which these bits may be transmitted is determined by the propagation delay within the system and by the repeater response times, as will be explained in the following discussion.

The portable transmitter transmits a burst of radio frequency energy having a predetermined time duration for each "1" present in the data stream of curve A. Curve B of FIG. 4 shows typical bursts of radio frequency energy produced by a portable unit. Note that in curve B two bursts of energy are sent to indicate the first two "1's" in the sequence, nothing is sent during the third bit interval to indicate a "0" and a burst is sent to indicate the last "1" in the sequence. The bursts of the curve B are not square bursts, but rather have a gradual buildup and decay time to reduce the bandwidth required by the system and to provide for buildup and decay of the transmitter. In a typical radio frequency system, the width of each of the pulses is on the order of 1 to 20 microseconds, and the pulse rate may be up to 40,000 pulses per second.

Curve C shows the detected output from a receiver, such as receiver 14 of a repeater or receiver 34 of a portable unit. Each of the detected outputs has multiple peaks, each peak corresponding to a burst received from a different transmitter in the system, the later received peaks corresponding to bursts from more distant transmitters. In curve C of FIG. 4, three peaks are shown for each detection, indicating that the receiver is receiving pulses from three different transmitters. For receivers receiving pulses from only a single transmitter or from transmitters that are closely spaced, the detected signal would have only a single peak.

The detected signal shown in curve C is applied to a decision amplifier having a detection level indicated by the dotted line 80. Whenever the detected signal exceeds the detection level 80, a signal is generated by the decision amplifier indicating that a "1" has been received. In a portable receiver, the output from the decision amplifier is demodulated to provide an audio or data output signal. In a repeater, the output from the decision amplifier is used to trigger the pulse generator 22 and pulse transmitter 16 to cause a pulse to be retransmitted.

Curve D shows the output signal transmitted by a repeater. Each repeater output pulse is similar to an output pulse from a portable transmitter, and is triggered when the signal detected by the repeater receiver exceeds the detection level 80. Each repeater pulse, shown in curve D, is delayed in time with respect to a corresponding portable transmitter pulse, shown in curve B, by an amount proportional to the propagation time between the portable transmitter and the repeater receiver, and by the time required for the detected signal to reach the detection level 80.

When the detected signal shown in curve C reaches the detection level 80, a signal is also applied to the delay generator 20 to cause the delay generator to generate a repeater blanking signal similar to the signal depicted in curve E of FIG. 4. The blanking signal causes the repeater to be non-responsive during the blanking time, which corresponds to a high output in curve E. In the circuit of FIG. 1, the delay generator 20 is connected to the pulse receiver 14 to disable the pulse receiver, however, the delay generator may be connected to the pulse transmitter 16, the pulse generator 22 or to any circuit to inhibit the generation of a new pulse by the repeater during the blanking interval. The length of the blanking interval is determined by the response time of each repeater and by the propagation delay times between repeaters. The blanking interval must be sufficiently long to prevent multiple triggering of a repeater by any one pulse from a portable unit. This implies that the blanking interval must be long enough to prevent multiple triggerings by the multiple peaks in the curve C, and must also be sufficiently long to prevent triggering by the repeater output shown in curve D and by the output signals from the other repeaters that are triggered by the repeater output shown in curve D.

In a typical single channel system for transmitting voice signals, satisfactory voice operation can be achieved employing a 30,000 bit per second data rate. In such a system, the pulse width would be on the order of 1 to 2 microseconds and the blanking interval could be on the order of 20 microseconds. From the above figures, it can be seen that the duty cycle of the transmitter is quite low, thereby allowing high peak powers to be generated by each transmitter while maintaining a low average power to conserve the transmitter batteries. In addition, since the propagation times for electromagnetic waves are on the order of 1 microsecond per thousand feet, systems may be built to operate in a typical plant at a data rate of about 1,000,000 bits per second. The higher data rates will allow for higher speed data transmission, or for the multiplexing of several voice channels within a given repeater system. For example, in a ten channel voice multiplex system, each portable unit will operate at a data rate of one-tenth the data rate of the repeater system, with every tenth bit of the repeater signal corresponding to a bit for a given portable unit. Because of the higher data rates required in a multiplex system, the blanking intervals will be shortened over the intervals provided for a single channel system to accommodate the higher data rate, and synchronization and logic circuitry will be necessary to provide the synchronization required for a multiplex system.

The system according to the invention is readily adaptable to ultrasonic systems wherein ultrasonic frequency sound pulses are transmitted rather than radio waves. In such a system, however, due to the lower velocity of sound waves compared to electromagnetic waves, the maximum bit rate that can be transmitted is reduced proportionately to the reduction in propagation velocity. In addition, light or infrared transmissions can be employed for line of sight systems, and any system employing a "chain reaction" substantially simultaneous triggering of the repeaters followed by a blanking interval of sufficient duration to allow decay of all pulses in the vicinity falls within the scope and spirit of the invention.

I claim:

1. A chain reaction type pulse communications system including a plurality of simultaneously triggered pulse repeaters, wherein all of said repeaters are triggered in a chain reaction in response to an input pulse applied to the system, said chain reaction having a predetermined time duration related to the response time of said repeaters and the propagation delay therebetween, each repeater including means for receiving a burst of oscillations having a predetermined frequency, transmitting means connected to said receiving means and responsive thereto for transmitting a burst of oscillations having substantially said predetermined frequency and a predetermined time duration immediately upon detection of said received burst in response thereto, and blanking means connected to said receiving means for rendering said repeater non-responsive to oscillations for a predetermined time interval equal to at least the time duration of the chain reaction following the receipt of each burst.

2. A communications system as recited in claim 1 further including a pulse producing transceiver including means for transmitting bursts of oscillations having substantially said predetermined frequency in a predetermined sequence in response to a signal applied thereto, and means for receiving bursts of oscillations having substantially said predetermined frequency and providing a detected signal in response thereto.

3. A communications system as recited in claim 2 wherein said transceiver further includes means for generating a predetermined sequence of pulses in response to an information signal applied thereto connected to said transmitting means and applying said pulses thereto, and converting means connected to said receiving means for receiving said detected signal and providing a demodulated information signal in response to said detected signal.

4. A communications system as recited in claim 3 wherein said pulse generating means includes means connected to said generating means for translating an acoustic signal to an analog information signal and providing the analog information signal to said pulse generating means, and means connected to said converting means for translating said demodulated information signal to an acoustic signal.

5. A communications system as recited in claim 3 further including means connected to said generating means for applying data information signals thereto, and means connected to said converting means for receiving data information signals therefrom.

6. A chain reaction type repeater communications system including in combination:

a transceiver including pulse means for generating a predetermined sequence of pulses in response to an information signal applied thereto and providing a demodulated signal in response to a pulse sequence applied thereto, means connected to said pulse means for transmitting bursts of oscillations having a predetermined oscillation frequency in response to said generated pulses, and means connected to said pulse means for receiving bursts of oscillations having substantially said predetermined frequency and for providing pulses to said pulse means in response to the bursts received thereby; and a plurality of substantially simultaneously triggered pulse repeaters deployed in a two dimensional array over a predetermined geographic area, each repeater being responsive to the bursts of oscillations provided by said transceiver to generate a chain reaction in response to each of said bursts, each repeater including means for detecting said bursts, means connected to said detecting means for generating and transmitting a repeat burst of oscillations having substantially said predetermined oscillation frequency immediately upon the detection of a burst by said detecting means, and means connected to said detecting means for rendering said repeater non-responsive to oscillation bursts for a predetermined time interval greater than the time duration of said chain reaction following the receipt of each burst to thereby prevent the generation of other repeat bursts during said predetermined time interval, each repeater being responsive to a burst from one of said other repeaters and said transceiver for generating one repeat burst of oscillations in response to each burst of oscillations transmitted by said transceiver.

7. A communications system as recited in claim 6 wherein said repeaters are arranged in a spaced relation with respect to each other, each repeater being sufficiently close to at least one other repeater to provide for reception of repeat bursts from each of said repeaters by at least one other repeater, all of said repeaters thereby being caused to transmit a burst upon receipt of a burst by any one of said repeaters.

8. A communications system as recited in claim 7 further including transducer means connected to said pulse means for receiving said demodulated signal and providing an acoustic signal in response thereto, said transducer means further including means for receiving an acoustic signal and applying an information signal to said pulse means in response to said acoustic signal.

9. A system as recited in claim 7 further including data means connected to said pulse means for applying data information thereto and for receiving demodulated signals therefrom.

10. A chain reaction type pulse communications system comprising a plurality of repeaters spaced in a two dimensional array, each repeater being spaced within communication range of at least one other repeater, each repeater including in combination:

receiving means responsive to signals having a predetermined frequency;

detecting means connected to said receiving means for detecting the presence of said predetermined frequency signal;

blanking means connected to said detecting means and responsive thereto for rendering said receiving means non-responsive to signals for a predetermined time interval greater than the time duration of said chain reaction after the predetermined frequency signal has been detected; and transmitting means connected to said detecting means and responsive thereto for transmitting a signal having said predetermined frequency for a predetermined time duration immediately upon the detection of said predetermined frequency signal by said detecting means.

11. The method for transmitting information within a predetermined geographic area, comprising the steps of:

dispersing a plurality of pulse repeaters in a two dimensional spaced relationship to each other over said predetermined geographic area;

providing binary signal bits representative of said information, each bit having one of first and second levels;

transmitting a burst of oscillations having a predetermined oscillation frequency and time duration to at least one of said repeaters in response to each bit having a predetermined one of said first and second levels;

receiving said bursts with one of said repeaters and transmitting therewith a repeat burst of oscillations having substantially said predetermined oscillation frequency and time duration to at least one of the other of said repeaters immediately upon receipt of said received bursts to thereby cause other ones of said repeaters to substantially simultaneously transmit another burst to other repeaters, thereby causing all of said repeaters to substantially simultaneously transmit bursts in chain reaction fashion in response to each burst initially transmitted;

rendering each of said repeaters non-responsive to bursts of oscillations for a predetermined time interval greater than the time duration of said chain reaction following the receipt of each initially transmitted burst;

receiving and detecting said bursts from at least one of said repeaters and providing second binary signal bits similar to said binary signal bits in response to said detected bursts; and converting said second binary signal bits to a second information signal representative of said information.

12. The method recited in claim 11 wherein said information is acoustic analog information and wherein the step of providing said binary signal bits comprises the steps of:

applying said analog acoustic information to a transducer to derive an analog electrical signal representative of said acoustic analog information; and applying said analog electrical signal to a modulator to convert said analog electrical signal to a binary signal having binary signal bits.

13. The method recited in claim 12 wherein the step of converting the second binary signal bits to a second information signal comprises the steps of:

applying said second binary signal bits to a demodulator to provide a second analog electrical signal representative of said information in response to said second binary bits; and applying said second analog electrical signal to a second transducer to derive said acoustic analog information from said second electrical analog signal.

* * * * *